United States Patent
Manceau

(10) Patent No.: US 11,391,264 B2
(45) Date of Patent: Jul. 19, 2022

(54) HORIZONTAL AXIS WIND TURBINE COMPRISING FAMILIES OF BLADES

(71) Applicant: Sebastien Manceau, Saint Pierre (FR)

(72) Inventor: Sebastien Manceau, Saint Pierre (FR)

(73) Assignee: Sebastien Manceau, Saint Pierre (FR)

( * ) Notice: Subject to any disclaimer, the term of this patent is extended or adjusted under 35 U.S.C. 154(b) by 919 days.

(21) Appl. No.: 15/030,253

(22) PCT Filed: Oct. 16, 2014

(86) PCT No.: PCT/FR2014/052638
§ 371 (c)(1),
(2) Date: Apr. 18, 2016

(87) PCT Pub. No.: WO2015/055958
PCT Pub. Date: Apr. 23, 2015

(65) Prior Publication Data
US 2016/0237987 A1 Aug. 18, 2016

(30) Foreign Application Priority Data
Oct. 18, 2013 (FR) ...................................... 1360206

(51) Int. Cl.
*F03D 7/02* (2006.01)
*F03D 13/10* (2016.01)
*F03D 1/06* (2006.01)

(52) U.S. Cl.
CPC ........... *F03D 7/022* (2013.01); *F03D 1/0608* (2013.01); *F03D 1/0675* (2013.01);
(Continued)

(58) Field of Classification Search
CPC .... F03D 1/0608; F03D 1/0633; F03D 1/0641; F03D 1/065; F03D 1/0658; F03D 1/0675; F03D 1/0683; F03D 3/002; F03D 7/022
(Continued)

(56) References Cited

U.S. PATENT DOCUMENTS 3,032,119 A * 5/1962 Hachmann ............ F03D 1/0608
416/200 R
4,065,225 A * 12/1977 Allison ................. F03D 7/0224
416/121

(Continued)

FOREIGN PATENT DOCUMENTS

DE 31 30 257 2/1983
DE 10 2009 03807 2/2011

(Continued)

OTHER PUBLICATIONS

Preliminary Search Report dated May 7, 2014 out of corresponding French priority Application No. 1360206 (2 pages).

(Continued)

*Primary Examiner* — David E Sosnowski
*Assistant Examiner* — Aye S Htay

(57) ABSTRACT

The invention relates to a wind turbine that includes a rotor rotating about a horizontal axis of rotation substantially parallel to the direction of the wind, the rotor having a front face facing into the wind and substantially perpendicular to the axis of the wind, and a rear face situated toward a support of the rotor. At least two distinct families of blades are distributed on the rotor, each family of blades including at least two blades having a free end and a blade root end connected to said rotor. Each family of blades includes a catching blade guiding the wind toward a force blade having a surface arranged substantially perpendicular to the axis of the wind, the blade root ends of each family of blades are successively offset on an exterior surface of the rotor along the axis of rotation thereof.

10 Claims, 8 Drawing Sheets

(52) U.S. Cl.
CPC ......... *F03D 1/0691* (2013.01); *F03D 7/0236* (2013.01); *F03D 13/10* (2016.05); *F05B 2240/221* (2013.01); *F05B 2240/2211* (2013.01); *F05B 2240/302* (2013.01); *F05B 2240/313* (2013.01); *F05B 2260/79* (2013.01); *Y02E 10/72* (2013.01)

(58) Field of Classification Search
USPC .................................. 415/4.3; 416/116, 119
See application file for complete search history.

(56) References Cited

U.S. PATENT DOCUMENTS

| | | | | | |
|---|---|---|---|---|---|
| 4,427,343 | A | * | 1/1984 | Fosdick | ................ F03D 1/0608 416/176 |
| 4,483,659 | A | * | 11/1984 | Armstrong | .............. F01D 5/142 415/181 |
| 4,687,416 | A | * | 8/1987 | Spranger | ................. B64C 11/18 416/200 R |
| 6,053,700 | A | * | 4/2000 | Fosdick | ..................... B63J 3/04 416/124 |
| 7,959,404 | B2 | * | 6/2011 | Caldwell | ................. F03D 3/002 415/2.1 |
| 2010/0090468 | A1 | * | 4/2010 | Hong | ...................... F03D 1/025 290/55 |
| 2011/0116923 | A1 | * | 5/2011 | Larsen | .................... F03B 3/121 416/1 |
| 2011/0206509 | A1 | * | 8/2011 | Benito Santiago | ... F03D 7/0232 416/23 |
| 2011/0309633 | A1 | * | 12/2011 | Padlo | .................... F03D 1/0633 290/55 |
| 2014/0271216 | A1 | * | 9/2014 | Syrovy | ................. F03D 1/0633 416/224 |
| 2017/0138336 | A1 | * | 5/2017 | Huang | .................. F03D 1/0633 |

FOREIGN PATENT DOCUMENTS

| | | |
|---|---|---|
| WO | WO 2007/057021 | 5/2007 |
| WO | WO 2009/097850 | 8/2009 |
| WO | WO 2010/053450 | 5/2010 |

OTHER PUBLICATIONS

International Search Report dated Dec. 22, 2014 out of corresponding priority Application No. PCT/FR2014/052638 (6 pages).
Written Opinion dated Dec. 22, 2014 out of corresponding priority Application No. PCT/FR2014/052638 (5 pages).

* cited by examiner

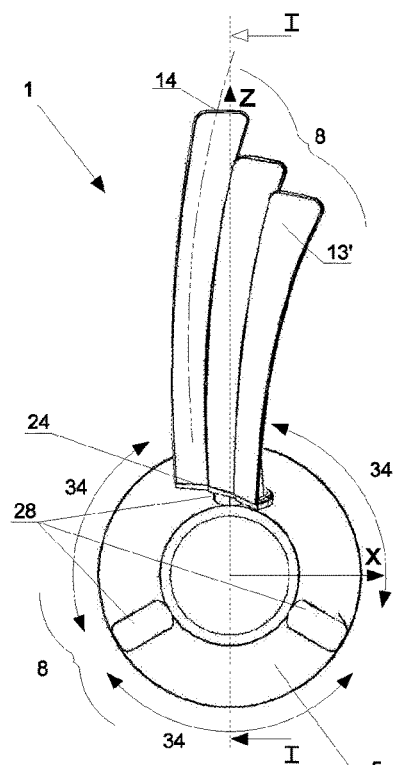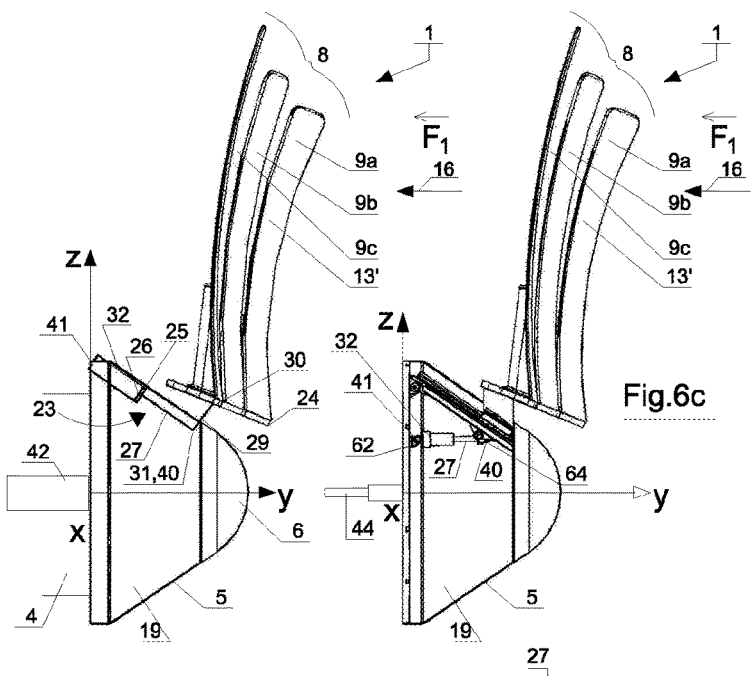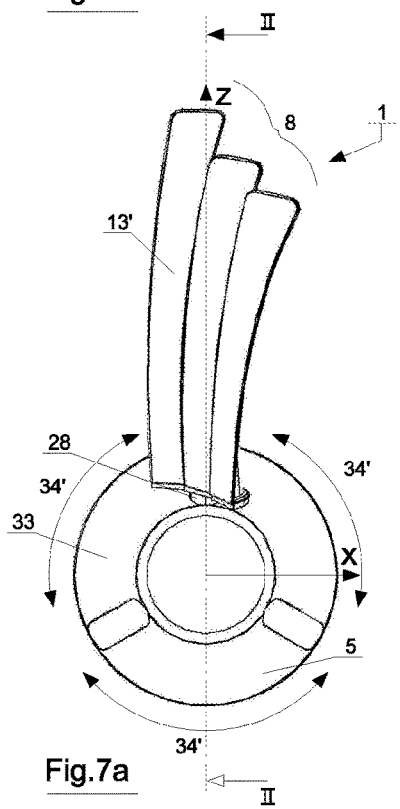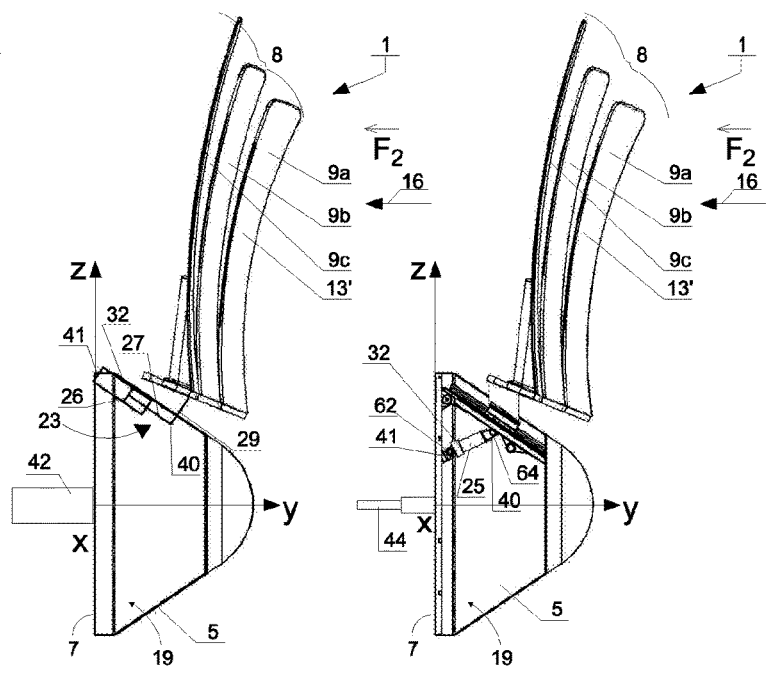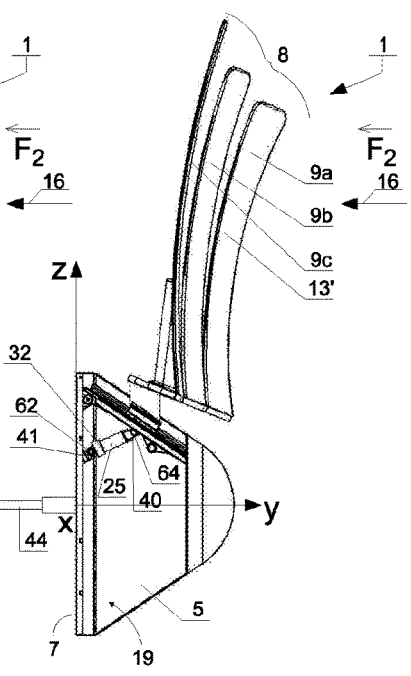

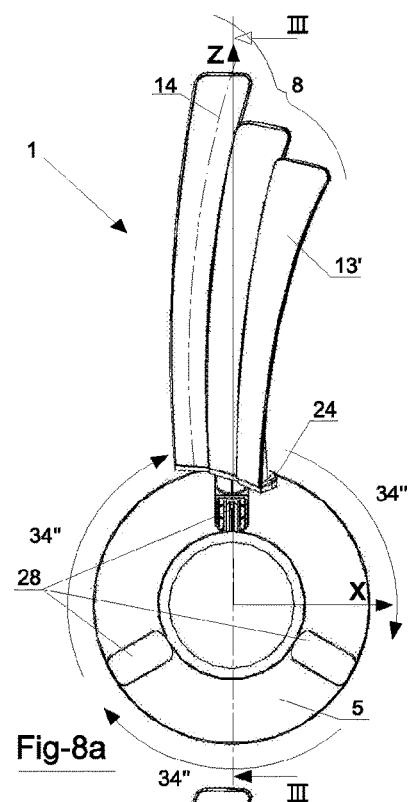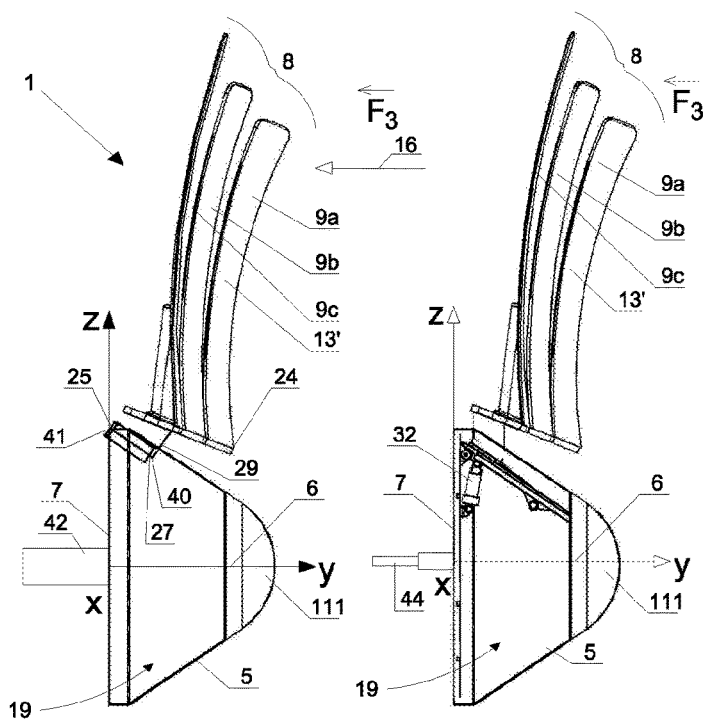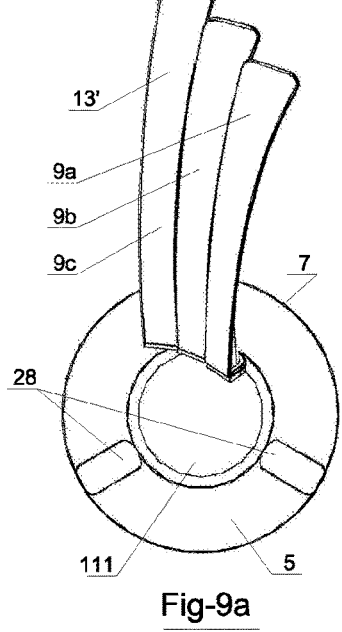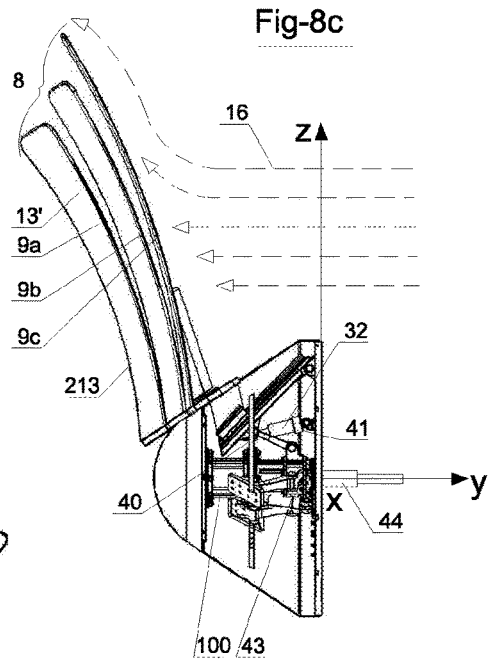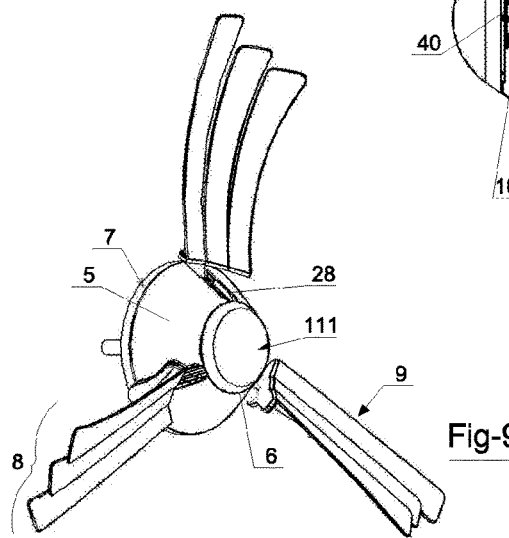

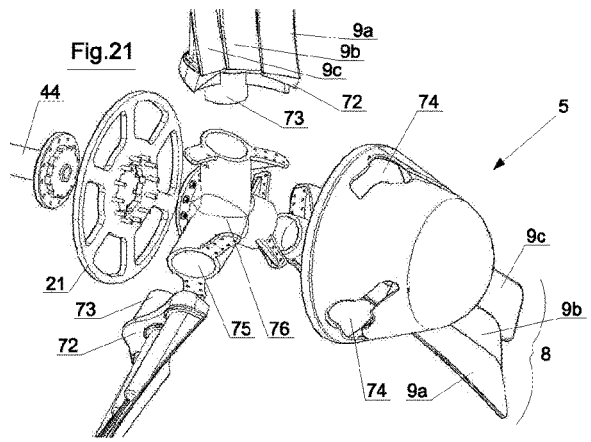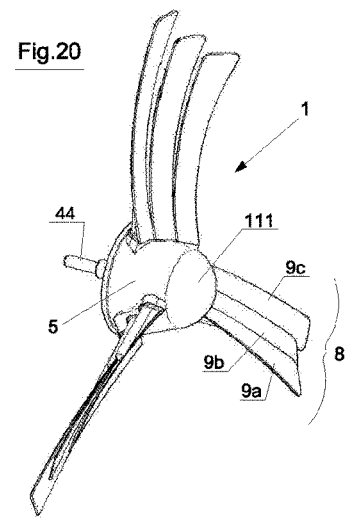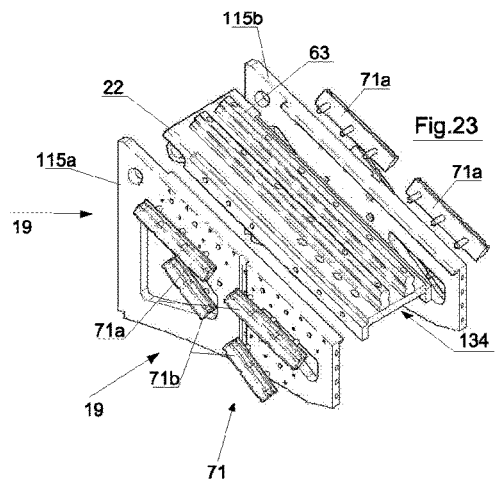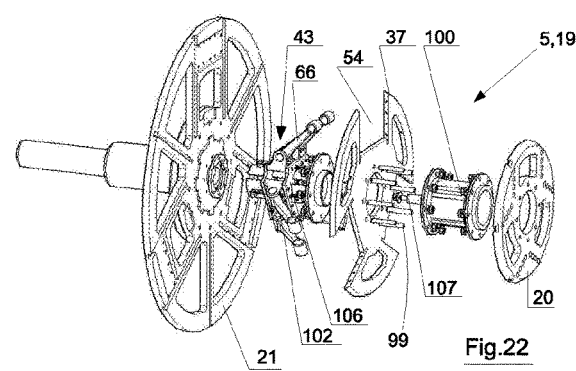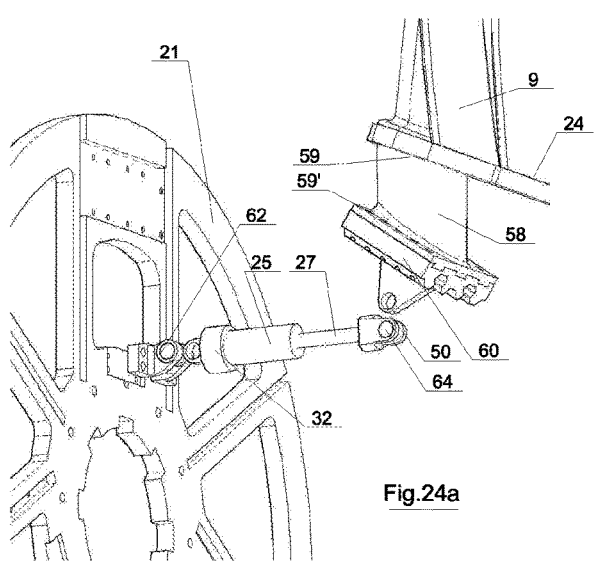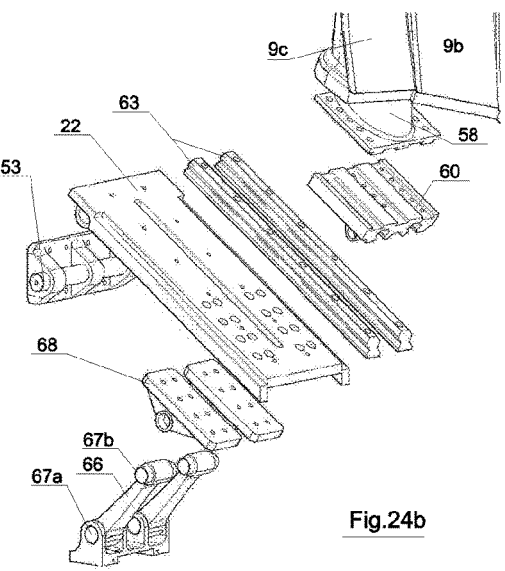

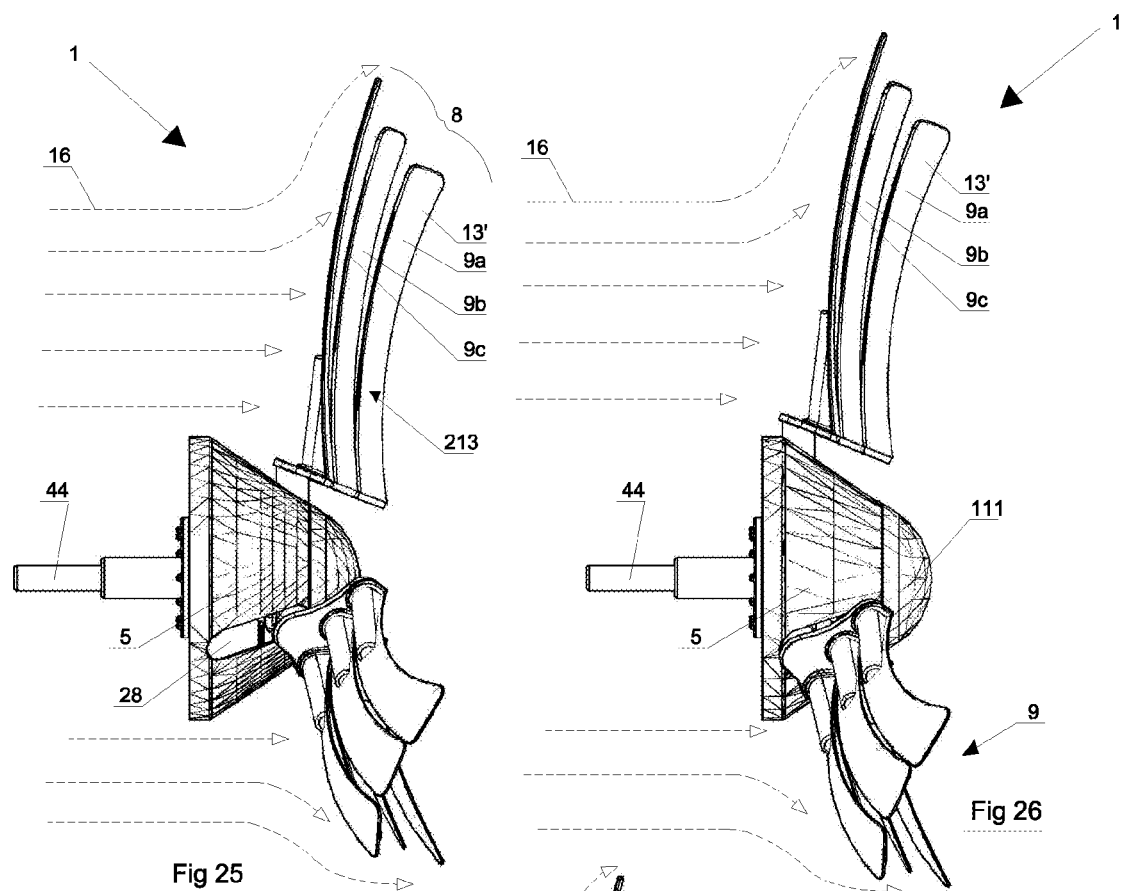
Fig 25
Fig 26
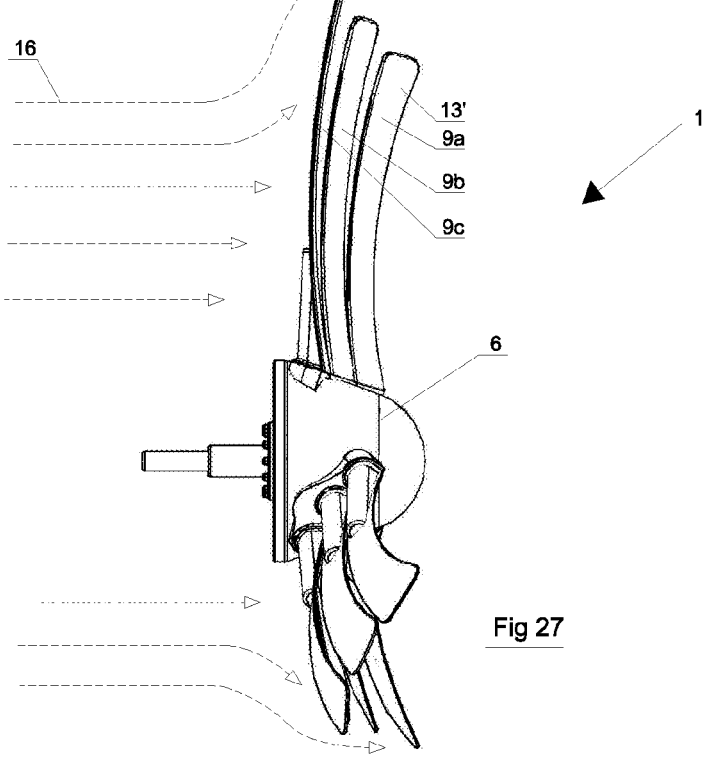
Fig 27

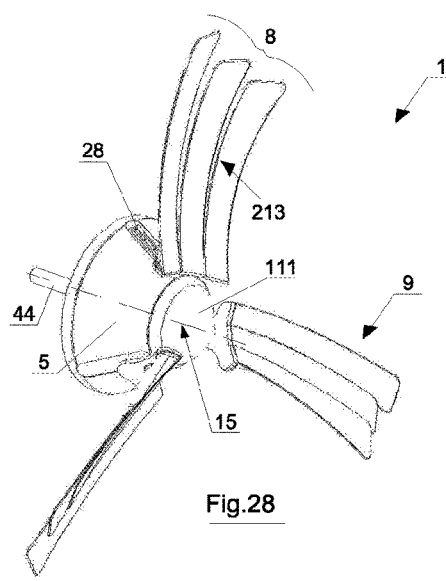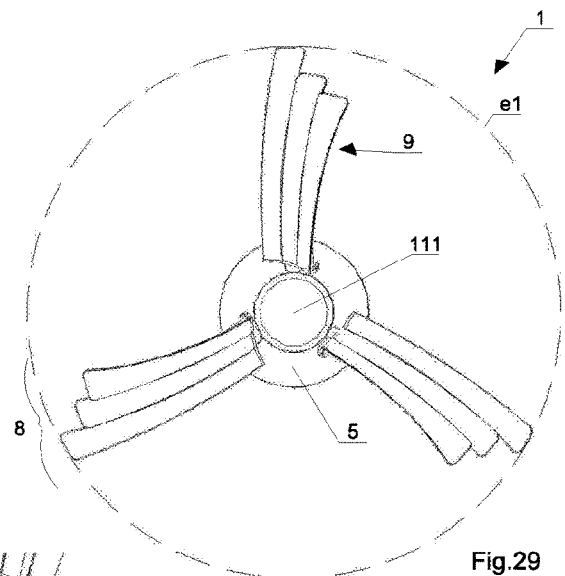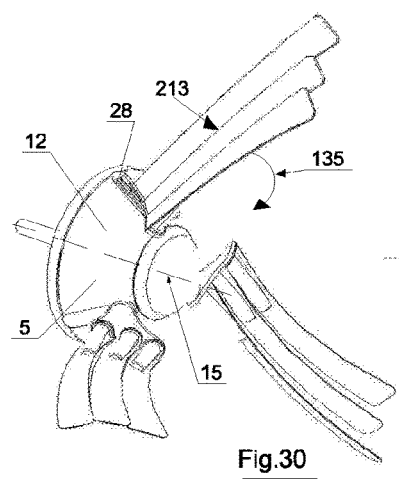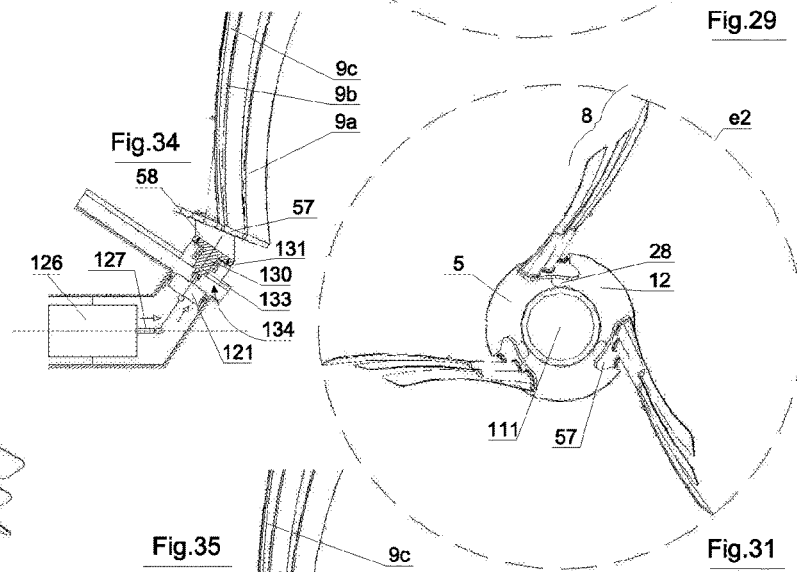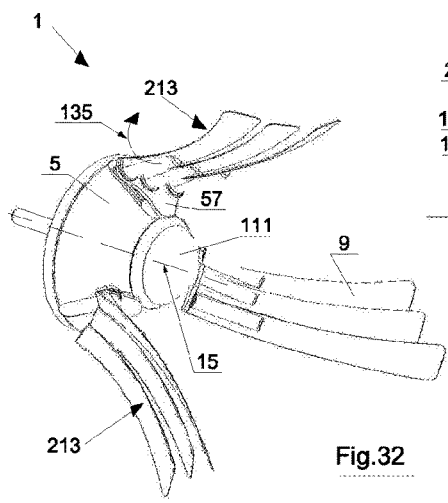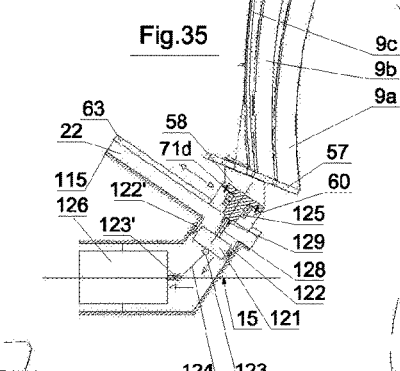

HORIZONTAL AXIS WIND TURBINE COMPRISING FAMILIES OF BLADES

This application claims priority to International Application No. PCT/FR2014/052638 filed Oct. 16, 2014 and to French Application No. 1360206 filed Oct. 18, 2013: the entire contents of each are incorporated herein by reference.

1. FIELD OF THE INVENTION

The present invention relates to the field of electrical energy production. It is aimed in particular at a wind turbine with a horizontal axis of rotation substantially parallel to the direction of the wind, used to convert the kinetic energy of the wind into mechanical energy which will itself be converted into electrical energy.

2. PRIOR ART

These days, in order to obtain greater technical and energy performance, experts in this field are proposing wind turbines equipped with blades of increasingly great length. The blade span of these wind turbines does not really suit the landscape because of the unsatisfactory esthetic appearance and the large size thereof. These wind turbines also require considerable logistics and extraordinary infrastructures in order to transport the components and assemble them, particularly in the case of offshore wind turbines.

The largest span (between 70 meters and 130 meters (m)) may reach nominal powers of between 2 and 7 megawatts at a windspeed in a range from 9 to 15 meters per second (medium wind). Above and below this range the wind turbines do not produce more energy. However, in order to increase their efficiency, wind turbines intended to produce a power of 10 megawatts (MW) with expected spans of 140 meters, namely the equivalent of 2 A380® airplanes side by side, are under development.

In strong winds, notably winds above 15 m/s, the crucial factor is the integrity of the wind turbine (reliability, robustness, stress loadings) rather than the energy efficiency thereof. Although the torque can be improved, the limiting factor is the laws of physics regarding the power coefficient (Cp) (the ratio between the energy supplied by the wind turbine with respect to the energy of the wind entering the surface swept by the blades). The upper production limit (maximum nominal power) is generally reached between 12 and 15 m/s (45 to 55 km/h), at which point the wind capacity captured at the blade tip and across the entire swept surface is then maximized. Added to this matter is the fact that beyond their nominal operating ranges, their power coefficient (Cp) begins to drop off drastically; wind turbines are slowed down in order to maintain the maximum nominal power already achieved.

Upwards of 25 m/s (storms, hurricanes), the mechanical stress loadings applied by the wind to the wind turbines and notably to the blades become very high and most wind turbines are automatically shut down in order to protect them. Upward of 25 m/s there is a risk of compromising the integrity of the wind turbines and a very high risk of breakage. In the onshore market, the noise and stormy episodes are factors that justify disconnection from the network well before excessively high winds arrive.

3. OBJECTIVES OF THE INVENTION

It is a notable objective of the invention to alleviate all or some of the disadvantages of the prior art.

One objective of the invention is to provide a wind turbine capable of operating in any type of wind, more specifically by providing better efficiency amongst other things under light wind and strong wind conditions.

In particular, one objective of the invention is to provide a wind turbine that produces more mechanical power as compared with a conventional wind turbine with an equivalent span or a wind turbine that produces equivalent mechanical power with a span that is reduced in comparison with a conventional wind turbine.

Yet another objective of the invention is to reduce the effect of shear and wake turbulence to the rear of the wind turbine that forces wind turbines of a wind farm to be spaced away from their neighbors. In other words, to allow the wind farms to be more densely populated with turbines.

4. SUMMARY OF THE INVENTION

These objectives are achieved using a wind turbine comprising:
a rotor for rotating about a horizontal axis of rotation substantially parallel to the direction of the wind, the rotor having a front face facing into the wind and said face being substantially perpendicular to the direction of the wind, and a rear face situated toward a support of the rotor; and
at least two distinct families of blades distributed over the rotor, each family of blades comprising at least three blades having a free end and a blade root end connected to said rotor; each family of blades comprising a catching blade guiding the wind toward a guide blade which guides the wind toward a force blade having a surface arranged substantially perpendicular to the direction of the wind, the blade root ends of the blades of each family of blades being successively offset on an exterior surface of the rotor along its axis of rotation and the catching blade has a length that is reduced in comparison with the guide blade which itself has a length that is reduced in comparison with the force blade.

Thus, such a configuration of families of blades makes it possible to supply a wind turbine that has a blade surface area substantially identical to that of a conventional wind turbine comprising very long blades by increasing the number of blades in a family. The same mechanical surface area facing into the wind is represented by the physical dimensions of the blades in a family. The surface of the blades is swept by the wind for a longer duration than conventional blades. The wind thus guided exerts a maximum thrusting force that is uninterrupted whatever the windspeed. The blades have the ability to accelerate with a light wind and notably with a strong wind. The arrangement of these blades therefore makes it possible to increase the efficiency that will need to compensate for part of the loss of moment (blade length*wind strength) at the blade tip (the blade-tip lever arm is lower when the blade lengths are reduced in comparison with a conventional wind turbine). Such an arrangement also makes it possible to reduce the span of the blades thus allowing the wind farm to be more densely populated with wind turbines. By, for example, halving the span in order to have an efficiency equivalent to a conventional wind turbine, the number of wind turbines in the same surface area, which in general is limited, can be doubled thus doubling the efficiency of a wind farm with respect to an exploitable area.

According to one particular feature of the invention, the catching blade may be positioned in front of the force blade along the axis of rotation of the rotor so as to create a different windage. The blades arranged in this way therefore behave a little like a succession of sailboat sails. Advantageously, the catching blade may be smaller in length but have a width that is greater than that of the force blade. The catching blade encounters the wind in the direction in which the wind is blowing and will seek to guide the first wind toward the next blade which is longer and will therefore enjoy a greater lever arm; the arrangement of these families will therefore make it possible to create microzones of depression encouraging the acceleration of the subsequent blades, making the drag only the consequence of the length of the next blade and creating coherence between the windspeed and the acceleration of the rotor and blade families assembly (under conditions of strong wind, the rotor and blade families assembly still has the capacity to accelerate in comparison with a conventional wind turbine). There is therefore less of a windbreak effect and that contributes to reducing the effects of wake behind the wind turbine.

According to one embodiment, each blade root end may be arranged on the surface of the rotor at a predetermined angle $\alpha$ formed between the axis of rotation of the rotor and the direction of the blade root end in order to better guide the wind onto the subsequent blades of each family.

In particular, the blades stand out from the rotor in a longitudinal direction that forms a predetermined angle $\beta$ with the surface of the rotor. In that way, the position of the blades on the rotor, combined with their orientation (blades angled) allow the wind to be concentrated toward the inside of the blades. In addition, such a configuration makes it possible to reduce the effects of turbulence which no longer acts on one blade at a time as in a conventional wind turbine, but acts on the entire family of blades.

Advantageously, the predetermined angle $\alpha$ or $\beta$ is greater than 0° and less than or equal to 90°.

According to another embodiment, the wind turbine comprises movement means moving the families of blades between: an initial position in which the families of blades are close to the horizontal axis of the rotor; and a developed position in which the families of blades are situated some distance from the horizontal axis of the rotor. In that way, the wind turbine is capable of operating in the case of light and strong winds and of being made safe at the same time notably in the case of strong winds.

Still with the same aim, the movement means cause the arrangement of the families of blades to vary in a movement that is:
- radial with respect to the axis of rotation of the rotor; and/or
- translational, substantially parallel to the surface of the rotor in a direction oriented from the rear face toward the front face or vice versa.

The movement means may be installed in or outside the rotor.

According to this embodiment, each family of blades is mounted on a single support connected to the movement means thereby making it possible easily to move the entire family of blades at the same time.

According to one alternative form of this embodiment and another embodiment, each family 8 of blades is mounted on a support comprising a base sliding along guide rails, said guide rails being arranged on a profiled section of a structure positioned in the rotor, the profiled section being connected to the movement means.

According to another embodiment, the structure comprises at least the profiled section provided with a first end and with a free second end, the profiled section being arranged between a first platform having an internal surface and a second platform to which the first end is articulated so that the profiled section is able to move between an operational first position in which the free second end lies flush with the surface and a feathered position in which the free second end is situated some distance from the surface via the movement means.

Advantageously, the support comprises means of setting the support in rotation with respect to the surface of the rotor about an axis of rotation passing through a root of the support at an angle of between 0° and 360°.

According to another embodiment of the invention, the wind turbine may comprise guide means which move each blade of a family substantially in a rotation about the axis of rotation of the rotor between an initial position in which the blades are close to the axis of rotation, and a retracted position in which the blades are close to the axis of rotation placed behind one another. This configuration makes it possible to increase the air that escapes between the families of blades and to reduce the windage on the blades in the event of strong winds, for example with respect to the swept surface of the (rotating) force blade.

According to another particular feature of these aforementioned embodiments, the rotor may comprise a wall comprising through-openings extending longitudinally from the front face toward the rear face of the rotor or extending in a curve comprising a first portion extending substantially longitudinally from the front face toward the rear face and a second portion extending in a direction substantially parallel to the direction of the blade root end of the force blade.

Advantageously, each through-opening is designed to receive at least one element connected to the movement means or guide means passing through the through-opening between the initial position and the deployed or retracted position.

Advantageously, the movement means or the guide means may comprise at least one hydraulic actuator or a worm that can be driven by an electric motor.

According to another embodiment, the rotor may have a cylindrical or frustoconical section. A cylindrical rotor allows the blades to be distributed suitably thereover. In the case of a rotor of frustoconical section, the objective of this configuration is to force the wind to cover a greater distance than with a conventional rotor. In addition, the thrusting force of the wind is better distributed from the blade root end to the free end of the blades, thereby improving the efficiency of the wind turbine and affording it greater stability.

5. LIST OF FIGURES

Further innovative advantages and features will become apparent from the description given hereinafter, provided by way of nonlimiting indication with reference to the attached drawings in which.

Figure 5:
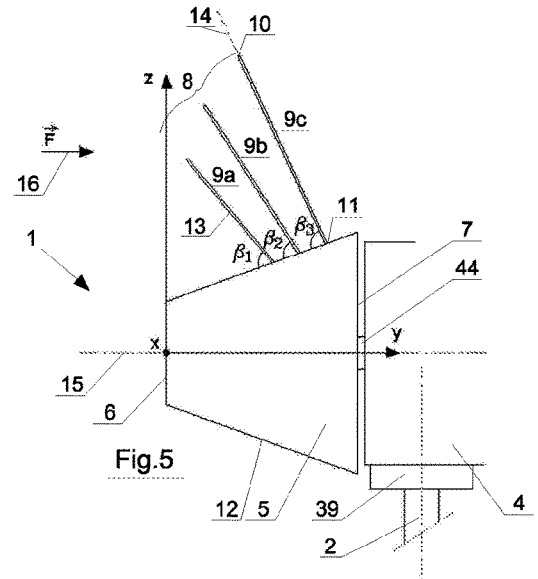
Figure 4:
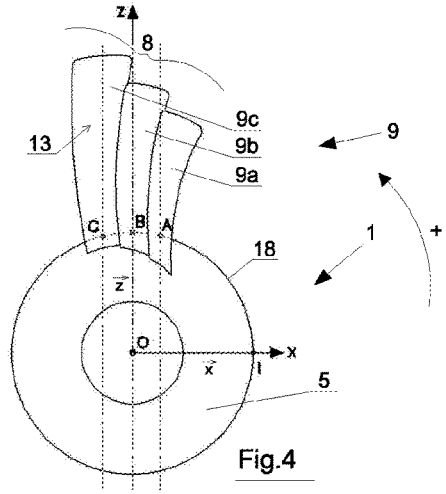
Figure 3:
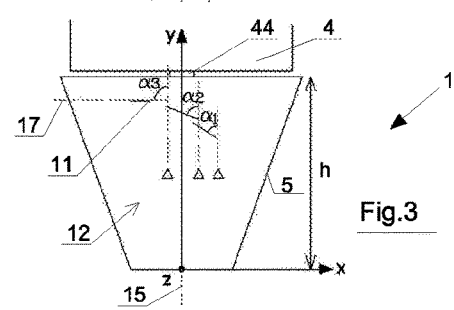
Figure 10A:
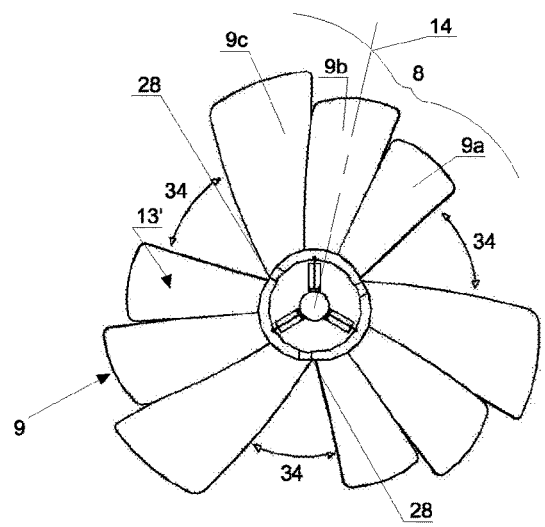
Figure 10B:
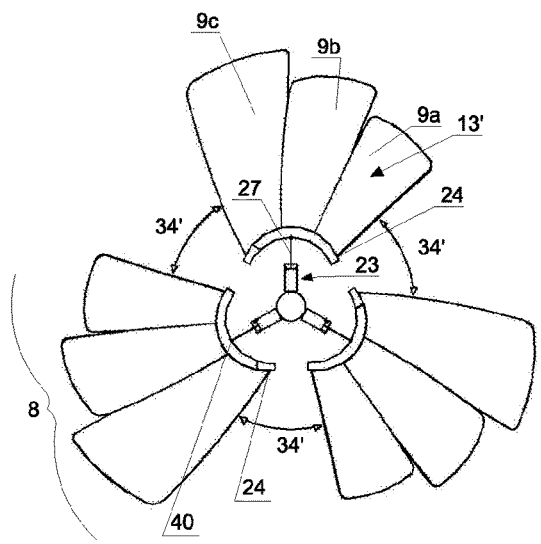
Figure 11:
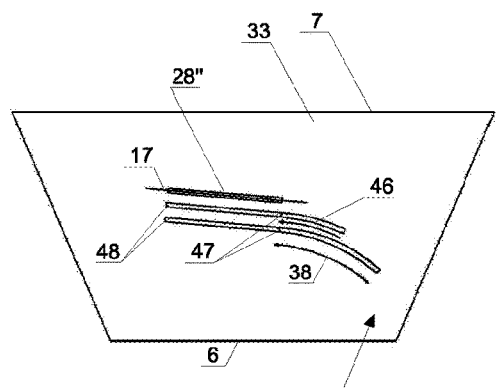
Figure 12:
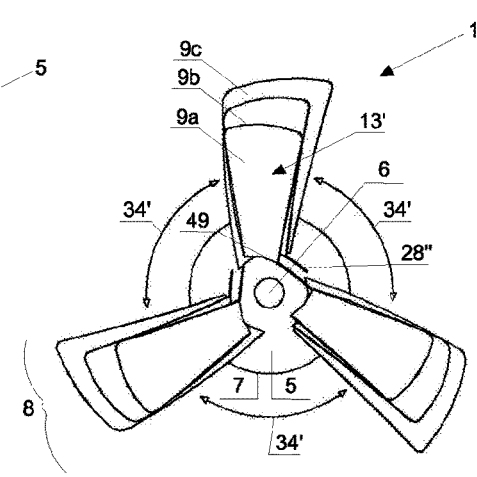
Figure 13:
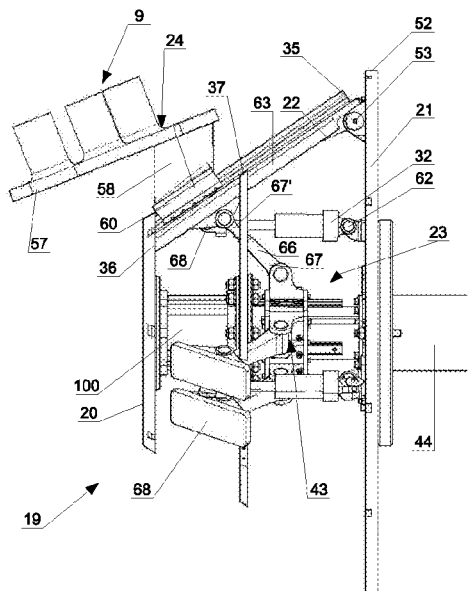
Figure 14:
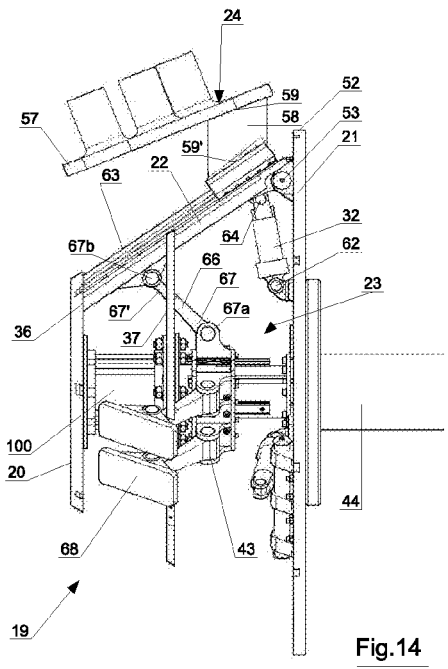
Figure 16:
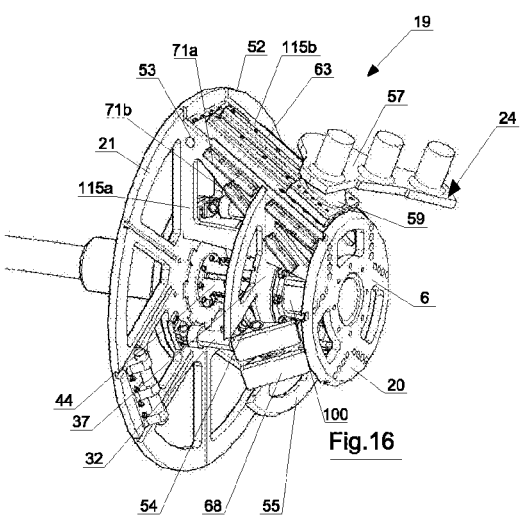
Figures 18, 19:
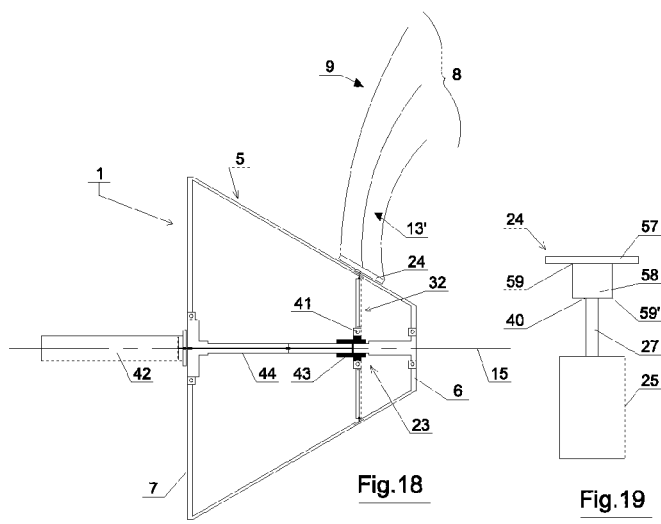

FIGS. 3, 4 and 5 schematically depict one embodiment of a wind turbine comprising blades referred to as static blades, the blades being arranged on the rotor with a particular orientation, FIG. 3 being a view from above of the blades on the rotor, FIG. 4 being a front view of the blades on the rotor and FIG. 5 being a side view of the rotor;

FIGS. 6a, 6b and 6d schematically illustrate another embodiment of the wind turbine comprising blades referred to as dynamic, the wind turbine being in a light-wind situation;

FIGS. 7a and 7b illustrate, according to the previous embodiment, the wind turbine in a medium-wind situation;

FIGS. 8a and 8b illustrate, according to the previous embodiment, the wind turbine in a strong-wind situation;

FIGS. 6c, 7c, 8c depict an alternative form of the embodiment illustrated in FIGS. 6a, 6b, 6d, 7a, 7b, 8a and 8b;

FIGS. 9a, 9b, 9c illustrate another embodiment of a wind turbine comprising "dynamic" blades and in a feathered position;

FIGS. 10a and 10b schematically depict yet another embodiment of a wind turbine comprising "dynamic" blades;

FIGS. 11 and 12 schematically depict another embodiment of a wind turbine comprising "dynamic" blades; FIG. 11 schematically illustrates a flattened part of the surface of the rotor which part has through-openings; FIG. 12 is a front view of the blades on the rotor;

FIGS. 13, 14, 15, 16, 17, 22 and 23 depict a structure and the alternative forms thereof collaborating with movement and/or guide means;

FIGS. 18 and 19 are yet another alternative form of the embodiment illustrated in FIGS. 6 to 8;

FIGS. 20 and 21 are further exemplary embodiments of a wind turbine;

FIGS. 24a and 24b depict detailed views of the internal part of the rotor, particularly of the means providing movement and damping movement;

FIGS. 25 and 26 illustrate side views of another embodiment of a "dynamic" wind turbine in which the wind turbines are in a safety position;

FIG. 27 depicts one example of a static wind turbine in a safety position;

FIGS. 28 to 33 illustrate another embodiment of a "dynamic" wind turbine in a feathered position and in which a support bearing the blades rotates; and FIGS. 34 and 35 are detailed views of the movement means illustrated in FIGS. 28 to 33.

6. DETAILED DESCRIPTION

The present invention relates to a wind turbine 1 designed to operate in any type of wind, namely under light-wind, medium-wind and strong-wind conditions. In the remainder of the description:

light wind means a wind the windspeed of which is between 0 and 5 to 7 m/s meters per second (m/s);

medium wind means a wind the windspeed of which is between 5 to 7 m/s and 10 to 15 m/s;

strong wind means a wind of which the windspeed is above 15 m/s; and violent wind (storms, hurricane) means a wind the windspeed of which is above 25 m/s.

Figure 1:
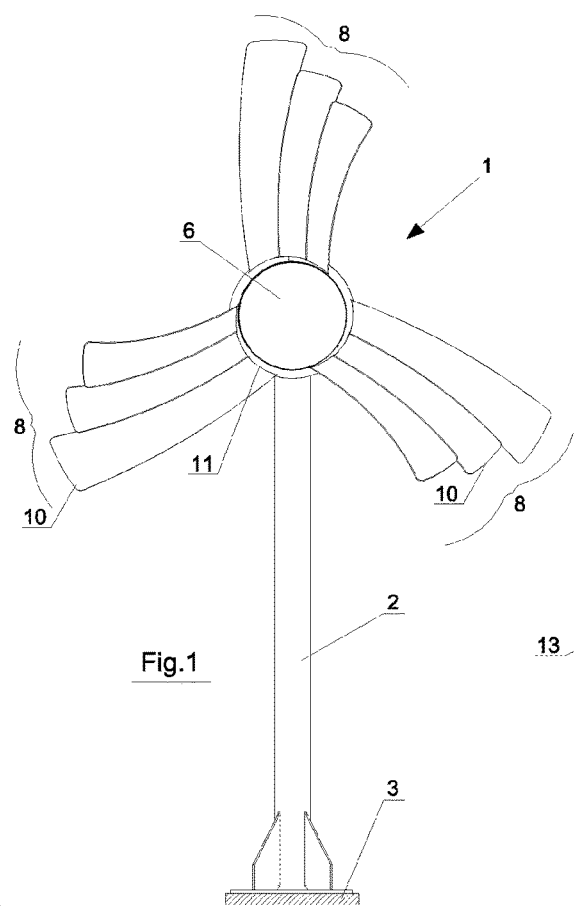
FIG. 1 is a front view of a wind turbine according to the invention.

In FIG. 1, the wind turbine 1 comprises a vertical mast 2 intended to be fixed to the ground (land-based (onshore) wind turbine) or to the seabed (offshore wind turbine) by means of a foundation 3. Stays or anchoring systems may be provided for firm securing to the ground or for the floating foundations 3. The top of the mast 2 is equipped with a nacelle 4 containing the elements needed for producing electricity (which are not depicted) such as an electric generator and a speed-increasing gear set. The nacelle 4 is mounted on a chassis 39 (FIG. 5) able to move with respect to the mast 2 via rolling bearings (not depicted). The wind turbine 1 also comprises a rotor 5 coupled to the nacelle 4 and allowing the driving of the electric generator. The rotor 5 rotates about a horizontal axis 15 of rotation with respect to the mast 2. The axis 15 of rotation is substantially parallel to the direction 16 of the wind. The expression substantially parallel means parallel or substantially parallel. The rotor 5 comprises a polymer, copolymer, metallic or composite material. The composite material may be a resin and a synthetic or natural fiber or may comprise a metal or a metal-containing alloy.

In order to make the invention even easier to understand, it will be considered that the mast 2 extends in a vertical longitudinal direction Z. Also depicted is the transverse horizontal direction Y in which the axis of rotation 15 of the rotor 5 extends, which axis is perpendicular to the vertical longitudinal direction Z and to a longitudinal direction X such that these three directions X, Y, Z form a direct orthogonal frame of reference as depicted in FIG. 1.

The terms "lower", "upper", "top", "bottom" and "lateral" are defined with respect to the vertical direction Z and the terms "front" and "rear" are defined with respect to the direction Y.

The rotor 5 has a front face 6 facing into the wind and substantially perpendicular to the direction of the wind, a rear face 7 situated toward a support of the rotor 5 and an external surface 12. In reality, the rear face 7 faces toward the nacelle 4. The expression substantially perpendicular means perpendicular or substantially perpendicular. The front face 6 may have a nose cone 111 of oblong shape to improve the aerodynamics of the rotor 5.

Figure 2:
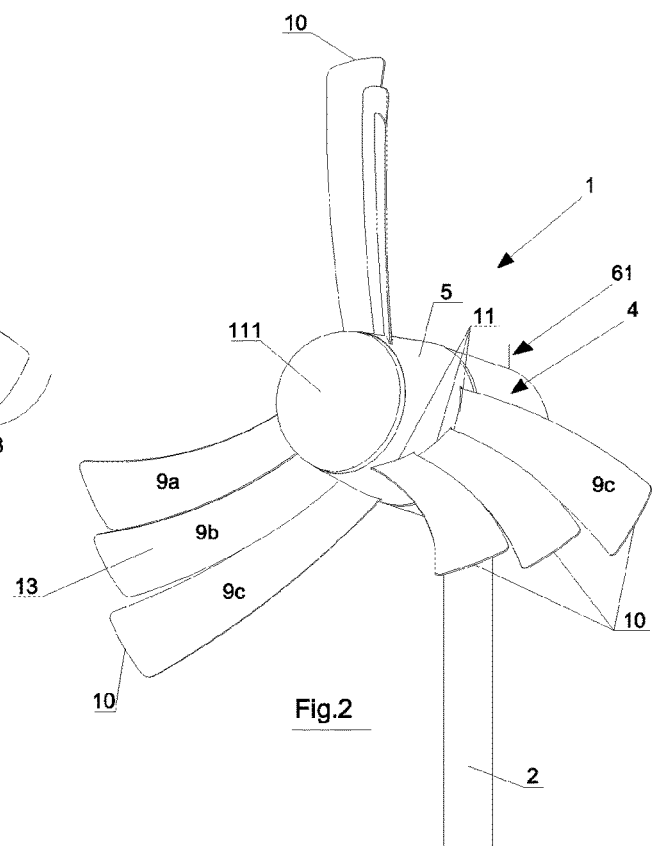
FIG. 2 is a perspective view of the wind turbine rotor on which the blades according to the invention are mounted.

According to the embodiment illustrated in FIGS. 1 and 2, the rotor 5 has a cylindrical section. According to the various embodiments illustrated in FIGS. 3 to 33, the rotor 5 has a frustoconical section. The rotor 5 bears at least two distinct families 8 of blades 9 distributed evenly on the external surface 12 of the rotor 5. The expression "family of blades" means a group grouping together a predetermined number of blades. The families 8 of blades 9 are identical in terms of their number of blades and in terms of the positioning of the blades on the rotor 5. Each family 8 of blades 9 comprises at least two blades 9 standing out from the rotor 5 in a main direction 14; these blades being a catching blade 9a and a force blade 9c.

In the various embodiments illustrated, a rotor 5 bears three families 8 of blades 9 distributed over the rotor 5 at an angle of 120°. Each family 8 comprises three blades 9. Each blade 9 has a free end 10 and a blade root end 11 connected to the rotor 5. Each blade 9 of a family has dimensions, an implantation, an orientation and/or a function that differ from those of the other blades. Each family includes: a catching blade 9a, a guide blade 9b and a force blade 9c. The wind is first of all caught by the catching blade 9a. The latter captures the wind then guides it toward the guide blade 9b. The guide blade 9b also guides the wind toward the force blade 9c on which the wind builds up. With this arrangement, the wind is trapped and can escape only by applying a thrusting force F to the blades 9a, 9b, 9c in turn. It will therefore be appreciated that the guide blade 9b is positioned in front of the force blade 9c along the axis 15 of rotation of the rotor 5. The catching blade 9a is positioned in front of the guide blade 9b along the axis 15 of rotation of the rotor 5. In that way, by forcing the wind to transmit its kinetic energy three times (or n times, n being the number of blades in a family), the time that the wind passes through the families 8 of blades is increased. If there are n blades in a family 8 where n is greater than three, then all the blades 9 situated between the catching blade 9a and the force blade 9c are guide blades 9b. Between each adjacent family 8 of blades 9 there is a space corresponding to an exhaust zone 34 via which some of the air (wind) escapes from the wind turbine 1. More specifically, the exhaust zone 34 is formed between the blade root end 11 till the free end 10 of the catching blade 9a of one family 8 and the blade root end 11 till the free end 10 of the force blade 9c of an adjacent family 8 of blades. As shown in FIGS. 1 and 2, the exhaust zone 34 is defined between a force blade 9c of one family 8 of blades 9 and a catching blade 9a of an immediately adjacent family of blades 8 and the exhaust zone subtends an azimuthal angle relative to the horizontal axis of rotation that has a magnitude that is greater than 30°, such as being greater than 90°. As shown in FIGS. 1 and 2, the exhaust zone as defined previously by the force blade 9c of one family of blades 9 and the catching blade 9a of an immediately adjacent family of blades 8 has no blades or blade family present therein.

The catching blade 9a has a length that is reduced in comparison with the guide blade 9b, which itself has a length that is reduced in comparison with the force blade 9c. In other words, the blades 9a, 9b, 9c of each family 8 have dimensions that increase along the axis 15 of rotation of the rotor 5 from the front face 6 toward the rear face 7 of the rotor 5. Furthermore, as shown in FIGS. 1, 2, and 4 and as viewed along the horizontal axis 15, the radial length of the force blade 9c as measured from the horizontal axis 15 is greater in magnitude than the radial length of the guide blade 9b as measured from the horizontal axis. As viewed along the horizontal axis 15, the radial length of the guide blade 9b as measured from the horizontal axis 15 is greater in magnitude than the radial length of the catching blade 9a as measured from the horizontal axis. Contrarily, the blade end 11 of the catching blade 9a has (at its base) a width that is greater than those of the guide blades 9b and force blades 9c. The force blade 9c has a blade end 11 of which the width (at its base) is less than those of the catching blades 9a and guide blades 9b. The blade root end 11 of each blade 9 has a length less than the free end 10. Such an arrangement also contributes to causing the wind to converge from the catching blade 9a toward the force blade 9c so that the latter stores up the maximum amount of energy. More specifically, the catching blade of 9a (small blade) positioned upstream of the other blades of a family allows a fresh mass of air undisturbed by the depression created after the air (wind) passes over the force blade 9c (last blade) of the adjacent (upstream) family 8 of blades to be caught as early as possible. This catching blade 9a then transmits the energy to the subsequent blades of its family while having already stored a first thrust on the way past.

Each blade 9 also has a flat surface 13 as depicted in FIGS. 1 to 5 or a substantially curved surface 13' as depicted in FIGS. 6b, 7b, 8b, 9b, 10b, 12, 18, 20 and 25. For preference, all the blades may be flat (without being curved). The blades 9 may also have a curvature in their main longitudinal direction 14.

As mentioned earlier, each blade 9a, 9b, 9c of each family 8 of blades 9 has an implantation and a particular orientation on the rotor 5; these are described according to an embodiment depicted in FIGS. 3, 4 and 5. In this embodiment, the rotor 5 has a frustoconical section. The blades 9 of the families 8 of blades are said to be "static", which means that the blades 9 are fixed with respect to the rotor 5.

FIG. 3 depicts, in view from above, the rotor 5 bearing the blades 9 in a horizontal plane Y, X formed by the directions Y and X. Just one family 8 of blades 9 is depicted here. The blade 9 root ends 11 of each blade that is a member of a family 8 of blades 9 are offset successively over the exterior surface 12 of the rotor 5 along the axis of rotation 15 thereof. In other words, the blades 9 are positioned on the external surface 12 at different heights, the height h of the rotor in direction Y (cylindrical or frustoconical) having the axis of rotation 15 passing through it. The blade 9 root ends 11 extend over the external surface 12 in a direction 17 in the plane Y, X and substantially transversely to the axis of rotation 15 of the rotor 5. Each blade 9 root end 11 is rectilinear in this instance. The directions 17 of the adjacent blade roots substantially form a curve oriented from the rear face 7 toward the front face 6 of the rotor 5. Each blade root end 11 is arranged on the external surface 12 of the rotor 5 at a predetermined angle α formed between the axis of rotation of the rotor 15 and the direction 17 of the blade root end 11 in the plane Y, X. More specifically, by drawing a straight line Δ parallel to the axis 15 of rotation 15 which intersects the straight line that determines the direction 17 of each blade end 11, the predetermined angle α is then obtained in the plane Y, X. This angle α is greater than 0° and less than or equal to 90°. The force blade 9c may form an angle $α_3$ which is substantially equal 90°. The angle $α_1$ may be between 35° and 50°. The angle $α_2$ may be between 45° and 75°. The angle $α_2$ is preferably between $α_3$ and $α_1$; it will be appreciated that the longer the blade, the larger the angle α.

In FIG. 4, the rotor 5 bears the families 8 of blades 9 in a vertical plane X, Z formed by the directions X and Z. The plane X, Z is perpendicular to the plane Y, X. The blade 9 root ends 11 are positioned on the perimeter of the rotor 5 (cylindrical or frustoconical). It was seen earlier that the blade root ends 11 are offset with respect to the height (axis of rotation 15) of the rotor 5 and have an angle α with the axis of rotation 15 in the plane Y, X. To make the description of FIG. 4 easier to understand, it is assumed that the blade root ends 11 are situated at the same height. It will also be assumed that the direction Y defines the center O of a trigonometric circle 18 in the frame of reference O, X, Z, of abscissa I and direct (counterclockwise) direction, the blade rood ends 11 being positioned on the perimeter of the trigonometric circle 18. The center of the length of the blade root end 11 of the catching blade 9a defines a point A belonging to the circle. As a result, the angle IOA forms for example an angle of approximately 5π/12 radians corresponding to approximately 75° in the plane Z, X. The center B of the length of the blade root end 11 of the guide blade 9b belonging to the circle, forms an angle IOB of approximately π/2 radians corresponding to 90° in the plane Z, X. The center C of the length of the blade root end 11 of the force blade 9c belonging to the circle forms an angle IOC of approximately 7π/12 radians corresponding to approximately 105° in the plane Z, X. In other words, the blades 9a, 9b, and 9c are offset from one another on the external surface 12 of the rotor 5 with respect to the axis Z in the plane Z, X. Of course, the position of the blades 9 on the perimeter of the rotor 5 is dependent on the number of blades 9 in a family 8 of blades 9 and on the span of the wind turbine 1. We will appreciate that this configuration (orientation and implantation) of the blades with respect to the surface of the rotor 5) contributes to the acceleration capacity of the rotor 5. Specifically, a first depression zone created after the wind has passed across the catching blade 9a allows the next guide blade 9b to accelerate. The guide blade 9b can still receive more wind/energy because it is larger than the catching blade 9a and so on. Thus, the guide blade 9b accelerates and stores energy while passing on some of the wind/energy to the next blade and so on. Moreover, the depression zones are channeled, thereby reducing the disturbance of the air leaving the rotor. FIG. 5 is a side view of the blades 9 of the rotor 5 bearing the blades in a vertical plane Z, Y formed by the directions Z and Y. The plane Z, Y is perpendicular to the plane Y, X. Just one family of blades is depicted here. The blades 9a, 9b, 9c of each family 9 have an inclination with respect to the external surface 12 of the rotor 5 which inclination is oriented toward the front face 6 of the rotor 5. The direction of the wind 16 is oriented toward the front face 6 of the rotor 5. The longitudinal direction 14 in which the blades 9a, 9b, 9c stand out from the rotor 5 forms a predetermined angle β with the external surface 12 of the rotor 5 in the plane Z, Y. The predetermined angle β is greater than 0° and less than or equal to 90° in the plane Z, Y. More specifically, the main longitudinal direction 14 of the catching blade 9a forms an angle $\beta_1$ with the external surface 12 of the rotor 5. The main longitudinal direction 14 of the guide blade 9b forms an angle $\beta_2$ with the external surface 12 of the rotor 5. The main longitudinal direction 14 of the force blade 9c forms an angle $\beta_3$ with the external surface 12 of the rotor 5. The angle $\beta_1$ is less than the angle $\beta_2$. The latter is also less than the angle $\beta_3$. The angle $\beta_3$ may be substantially equal to 90° in the plane Z, Y. The angle $\beta_2$ may be between 45° and 75° in the plane Z, Y. For preference, the angle $\beta_2$ is between $\beta_1$ and $\beta_2$. The angle $\beta_1$ may be between 35° and 50° in the plane Z, Y. It will also be appreciated that the larger the blade 9, the greater the angle β.

Wind turbines 1 that are small in size and not very bulky, and medium-sized wind turbines 1 or wind turbines that have the dimensions of a conventional wind turbine are catered for. As far as the small wind turbines are concerned, the rotor 5 and the blades 9 are formed of a single piece as illustrated in FIG. 20 or formed from an assembly of molded components. The rotor 5 is advantageously obtained by molding. Small static wind turbines may be provided for each type of wind. In the case of the medium and large static wind turbines, see for example FIG. 21, each blade 9a, 9b, 9c of a family 8 of blades 9 is mounted on a base with the same implantation and orientation as described above. The base 72 is mounted on the rotor 5 by means of a sleeve 73 through an orifice 74 that the rotor 5 comprises. The sleeve 73 is fitted into a cavity 75 of an assembly 76 secured to the shaft 44.

According to other embodiments depicted in FIGS. 6, 7, 8, 9, 10, 13, 14, 16, 17, 18, 25, 26, 28 (dynamic wind turbines), the wind turbine 1 comprises dynamic blade families 8, each family 8 of blades 9 being able to move with respect to the rotor 5, which here is of frustoconical section in order to adapt to light, medium or strong winds. For the versions referred to as "dynamic" exactly the same positioning situations (dimensions, implantations, orientations) for installing the blades 9 in a family 8 on the rotor 5 as were seen earlier for "static" families are reused. However, in this case, each family 8 of blades 9 is considered to be a block or assembly that is fixed with respect to a support 24 but which can move in space with respect to the rotor 5. In other words, the families 8 of blades maintain the configuration and arrangement of the static blades (orientation, inclination on the external surface 12 of the rotor) but can move in blocks and in synchronized manner so as to optimize the efficiency of the wind turbine according to the various wind strengths.

Movement means 23 are provided to move the families 8 of blades 9 between an initial position in which the families 8 of blades are close to the horizontal axis 15 of rotation of the rotor 5 (close to the front face 6) and a developed position in which the families 8 of blades 9 are situated some distance from the axis of rotation 15 of the rotor 5 (close to the rear face 7). In the initial position, the movement means 23 comprise at least one actuator 32 or worm. For preference, these are actuators 32 each comprising a cylinder 25 in which a piston 26 and rod 27 assembly slides.

Figure 17:
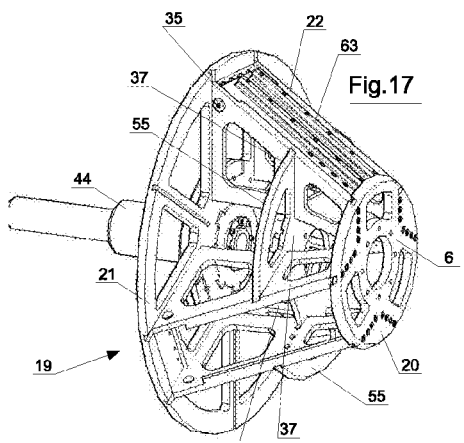

The wind turbine 1 referred to as dynamic comprises a structure 19 as depicted for example in FIGS. 6 to 9 and 13, and in particular in FIG. 17. The structure 19 also has a frustoconical section to adapt to the form of the rotor 5. The structure 19 comprises a first platform 20 and a second platform 21 which are mounted with a built-in connection onto a shaft 44 that rotates the rotor 5. The structure 19 comprises profiled sections 22 mounted fixedly for example in FIGS. 6 to 8 and 17, 28 to 33 on two crossmembers 115a and 115b which are arranged between the first 20 and second 21 platforms. The profiled sections 22 are also fixed with respect to the first 20 and second 21 platforms (for example in FIG. 17). The profiled sections 22 may also be mounted with the ability to move with respect to the crossmembers 115a and 115b (for example in FIGS. 13 to 16) and with respect to the first 20 and second 21 platforms. In the case of profiled sections 22 capable of moving, each profiled section 22 has a first end 35 connected toward the periphery 52 of the second platform 21 with a pivot connection 53 and a free second end 36. A plate 37 is mounted fixedly on the shaft 44 and is situated between the first 20 and second 21 platforms. The plate 37 has cutouts 54 or openings accepting the crossmembers 115a, 115b and each allowing a profiled section 22 to pass as it pivots about the pivot connection 53. Between the cutouts 54 the plate 37 forms spacers 55 between the profiled sections 22 so as to maintain a spacing between these and stiffen the structure 19. The latter here comprises a profiled section 22 for each family 8 of blades 9. The difference in diameter between the first 20 and second 21 platforms implies that the direction in which each profiled section 22 extends forms a slope with respect to the first 20 and second 21 platforms.

The families 8 of blades are each mounted on the support 24 connected at least to the movement means 23. In that way, in a movement, it is the support 24 that moves causing simultaneous movement of the families 8 of blades 9. The support 24 is positioned on the external surface 12 of the rotor 5 and is able to move with respect to this surface. The support 24 comprises a root 58 supporting a mounting plate 57 at one of its ends 59.

The mounting plate 57 (for example in FIGS. 15, 16) may have any type of shape: with four or a multitude of corners, or round. The mounting plate 57 has a main length substantially equal to the sum of the lengths of the blade root ends 11 of the blades 9 in a family 8. The main width of the mounting plate 57 corresponds substantially to a portion of the height of the rotor 5 that corresponds to the distance between one of the ends (the end closest to the front face 6) of the blade root end 11 of the catching blade 9a and one of the ends (the end closest to the rear face 7) of the blade root end 11 of the force blade 9c. The mounting plate 57 may overhang the nose cone 111 of the wind turbine. The support 24 may therefore find itself forward of the front face 6 of the wind turbine 1 so as to allow the families of blades to close off the air exhaust zone 34 as much as possible in light-wind configurations.

The wall 33 of the rotor 5 comprises through-openings 28 and 28" passing right through the wall 33.

According to the embodiments of FIGS. 6a, 6b, 6d, 7a, 7b, 8a and 8b an actuator 32 is arranged in each profiled section 22. The cylinder 25 of the actuator 32 is fixed with respect to the profiled section 22 and is mounted parallel to the external surface 12 of the rotor 5. The through-opening 28 extends longitudinally along the axis of rotation 15 of the rotor 5. The through-opening 28 allows an arm 29 to pass through, which arm comprises a first end 30 secured to the free end of the root 58 of the support 24 and a second end 31 secured to a distal end 40 of the rod 27 of the piston of the actuator 32. Advantageously, the arm 29 is fixed to the rod 27 in a direction parallel to the axis Z. Each through-opening 28 has a length substantially equal to the height of the rotor 5. At least one load cell 50 (depicted schematically in FIGS. 6d and 24a) is fixed by any suitable means to the movement means 23. In this particular instance, the load cell 50 is fixed to the distal end 40 of the rod 27 of the actuator 32. The load cell 50 is electrically connected to an electronic circuit (not depicted) which is positioned in the rotor 5 or in a unit (not depicted) installed toward the rear face 7 of the rotor 5. The load cell 50 measures the force applied by the wind to the family of blades that is connected to the rod 27 of the actuator 32 via the support 24. The electronic circuit comprises a microcontroller comprising wind parameters. The actuator 32 has, amongst other things, means of electrical connection to an electric motor 42 situated toward the rear face 7 of the rotor 5, the electric motor 42 being connected to the microcontroller. An anemometer 61 (schematically indicated) may also be provided on the nacelle 4, the blades 9 or in the wind farm in order to determine the windspeed or the wind pressure.

When the force applied by the wind is above a predetermined force, a microcontroller commands the electric motor 42 which then actuates the actuators 32 in order to move the families of blades. When the piston 26 moves in the cylinder 25, the rod 27 drives the arm 29 in a translational movement through the longitudinal through-opening 28.

In FIGS. 6a (front view), 6b and 6d (views in section on the plane I-I), the wind turbine 1 is facing a light wind which is applying a thrust force $F_1$ to the families of blades that are therefore situated near the front face 6 of the rotor 5. In this situation, the rod 27 of the piston 26 is completely deployed. The exhaust zone 34 here referred to as the initial exhaust zone is small and the span (diameter of the force blade) is reduced. In FIGS. 7a (front view) and 7b (views in section on the plane II-II), the blades 9 of the wind turbine 1 are experiencing a thrust force $F_2$ of a medium wind. The thrust force $F_2$ is higher than the thrust force $F_1$. Thus, the piston 26 moves translationally over the cylinder 25 in a direction parallel to the external surface 12 of the rotor (here of from the front face 6 toward the rear face 7 of the rotor 5). The families 8 of blades move at the same time in a translational movement parallel to the external surface 12 of the rotor oriented from the front face 6 toward the rear face 7 and vice versa. The families 8 of blades 9 therefore find themselves approximately midway along the length of the through-opening 28. It will be appreciated that after the blades 9a, 9b, 9c have moved they still face into the wind. In moving the families 8 of blades the surface area of the exhaust zone 34 is varied. In this configuration, the surface area of the exhaust zone 34' is greater than the surface area of the initial exhaust zone 34 when the blades 9 are close to the front face 6, thereby increasing the capacity of the exhaust zone 34' allowing more air to flow. The span of the wind turbine thus increases. In other words, the stronger the wind, the greater the space corresponding to the exhaust zone 34, 34', 34" needs to be in order to discharge the excess air that risks slowing the rotation of the rotor 5.

In FIG. 8a (front view) and FIG. 8b (views in section on the plane III-III), the wind turbine 1 is faced with a strong wind applying a thrust force $F_3$ to the families 8 of blades, the thrust force F3 being greater than the thrust force $F_2$. The piston effects a translational movement toward the rear face 7 of the rotor in order to effect a full stroke. The families 8 of blades move in a similar way to in FIGS. 7a and 7b and therefore lie close to the rear face 7 of the rotor 5. Thus, as before, it will be appreciated that after the blades 9a, 9b, 9c have moved, they still face into the wind. The surface area of the exhaust zone 34" is therefore greater than the surface area of the exhaust zone 34' so as to increase still further the flow of air through this zone and decrease (the windage on the blades 9) the proportion of the windage of the blades with respect to the swept surface area (surface area swept by the force blade as it rotates).

FIGS. 6c, 7c, 8c, 17 and 24a depict an alternative form of the embodiment illustrated in FIGS. 6a, 6b, 6d, 7a, 7b, 8a and 8b, in which the actuator 32 comprises two pivot connections allowing it to be offset from the axis of movement of the support 24 (see detail in FIG. 24a). The proximal end 41 of the actuator 32 is pivot-mounted on the second platform 21 of the structure 19 via an articulation 62. This pivot connection 62 is positioned closer to the axis of rotation 15 of the platform 21 and thus makes it possible to free up some space for the sliding of the support 24 toward the periphery of the structure 21. The root 58 of the support 24 comprises a base 60 at its other end 59', which is in the shape of a U. This base 60 is intended to collaborate with a longitudinal rail 63 of U-shaped section which is fixed in each profiled section 22 of the structure 19. The base 60 is also connected via a pivot connection 64 to the distal end 40 of the rod 27 of the piston 26 of the actuator 32. FIG. 17 is a perspective view of the structure 19 with the profiled sections 22 fixed with respect to the first 20 and second 21 platform. Just like in the previous embodiment, the support 24 can move from the bottom upward and vice versa along the slope defined by the rotor 5. By virtue of the novel arrangement of the actuator 32, the base 60 can slide up more and therefore allow the wind turbine 1 a greater developed position than before.

In a preferred alternative form of this embodiment, the actuators 32 are able to be mobile through the mere thrust of the wind (without the action of the motor 42) in order to move the families 8 of blades 9 via the support 24. The families 8 of blades 9 therefore move from the initial position toward the developed position using the thrust of the wind applied to the blades 9. The families 8 of blades 9 return to the initial position under the effect of their weight. The resistance of the actuator 32 will be calibrated beforehand as desired (implying no external intervention such as electronic, electrical or hydraulic intervention from light winds up to acceptable ranges of operation in strong and not violent winds): the stronger the wind (greater the centrifugal force) the greater will be the resistance of the actuator 32, naturally returning the blades 9 to the down position (initial position) when the wind weakens. The three actuators 32 operate independently, because they are not commanded. Only the thrust of the wind drives them. The rotational speed will mean that the forces experienced by the actuators 32 will be near-identical so that they will react in the same way and at the same time. As mentioned hereinabove in the previous embodiments, the blades 9 of each family 8 maintain their initial positions relative to one another (on the support 24) in accordance with the same configuration as the static wind turbines described previously.

Figure 15:
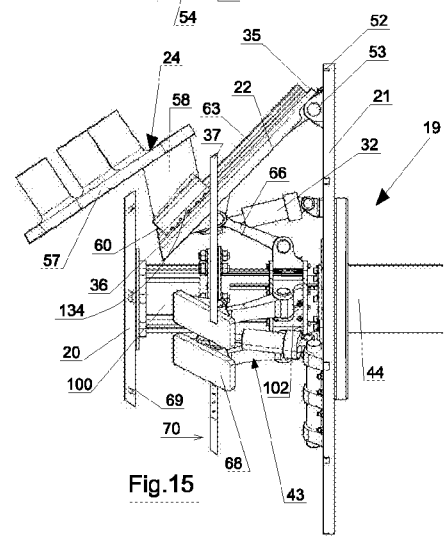

According to another embodiment as may be seen in FIGS. 9b, 9c and 15, the dynamic wind turbine 1 is in a "pivoted" feathered position. The feathered position follows on from the safety position that the dynamic wind turbine 1 can adopt as illustrated for example in FIGS. 9, 13, 14 and 16. This embodiment of the "pivoting" dynamic wind turbine is reserved more for regions in which violent winds may be encountered.

The dynamic movement of the blades 9 remains identical to that of the blades of the wind turbines illustrated in FIGS. 6 to 8. In this embodiment, and more specially upon feathering or return to the operational position (the blades resuming the dynamic movement along the rotor according to the strength of the wind) movement means 23 comprise the actuator 32 and also at least one connecting rod 66 of which one end 67 is articulated to a sliding assembly 43 sliding along the shaft 44. The opposite other end 67' is also articulated to a base 68 secured to the profiled sections 22. The base 68 is secured to the profiled section 22 toward the free end 36. In this instance, two connecting rods 66 support (particularly the bases 68) a profiled section 22. The sliding assembly 43 comprises a central actuator 100 which damps the pivoting of the support 24. In our particular case, because the actuator 32 is connected to the base 60, it therefore accompanies the pivoting movement of the profiled sections 22. However, the actuator 32 damps the pivoting of the profiled sections 22 only to a lesser extent, that function being reserved for the central actuator 100. The latter is mounted on the shaft 44 of the rotor 5 and moves between the first 20 and second 21 platforms. The sliding assembly 43 is connected via mechanical and electrical connection means to the electric motor 42 situated toward the rear face 7.

In this embodiment (see FIGS. 15 and 22), the movement means 23 comprising the sliding assembly 43 is triggered either manually by an operator or is controlled by the microcontroller that receives information from the cell 50 or alternatively is controlled remotely by the operator via an on-board computer that receives information from the anemometer 61 or according to other meteorological information. This is done when the winds are violent and the operator considers it necessary to feather the pivoting dynamic wind turbine 1. To do that, the wind turbine 1 will have been set with its back to the wind beforehand, in a down safety position (FIG. 15 for example). In the context of feathering, the profiled sections 22 are able to move with respect to the first 20 and second 21 platforms. The sliding assembly 43 allows the profiled section 22 to pivot between an operational position in which the free end 36 lies flush with the surface 69 of the first platform and a feathered position in which the free end 36 is not flush with the surface 69 and on the inside of the rotor 5. The driving part of the sliding assembly 43 is generated by the actuator 100 and/or the weight of the blades 9. The actuator 100 comprises a rod 107 which is connected by a flange 106 to a slider 102. The latter moves along the axis of rotation of the shaft 44. Movement of the sliding assembly 43 and of the profiled section 22 is brought about via at least the connecting rod 66 and two pivot connections 67a and 67b at the location of the articulations of the ends 67, 67. More specifically, in the operational position, the families 8 of blades 9 are situated near the front face 6 (in this instance the first platform 20). The slider 102 is situated near the front face 6. The piston 107 of the actuator 100 is retracted and the actuator 100 is also near the first platform 20. Each base 60 is blocked in position by blocking means situated in the lower part 134 of the base 60. The structure 19 comprises locking means 71 (see FIG. 23) that block the profiled sections 22 on the crossmembers 115a, 115b. In order to move from the operational position into the feathered position, the operator actuates locking means 71a to release the profiled sections 22 from the crossmembers 115a, 115b. Each profiled section 22 then rotates (pivots) toward the center of the rotor 5 via the pivot connection 53. The sliding assembly 43 supporting the connecting rods 66 therefore simultaneously performs a translational movement in the direction of the arrow 70, thereby lowering (in the plane Z, Y of FIG. 15) the free end 36. The latter is then no longer adjacent to a surface 69 of the first platform 20. In the feathered position, the slider 102 is located after rotation near the second platform 21. The rotation of the profiled sections 22 is damped by the central actuator 100. Part of the root 58 or the entire root is located inside the rotor 5. The support 24 is flush with the surface of 12 of the rotor 5 in the feathered position. Each profiled section 22 is then blocked in this feathered position by locking means 71b on the crossmembers 115a, 115b. The families 8 of blades 9 in the feathered position have a smaller circumference, thus reducing their windage.

When the hurricane has passed and the checks prior to resumption of operation have been carried out, the operator intervenes physically or remotely on the wind turbine 1 to unblock the profiled sections 22 from their feathered position by unblocking the locking means 71b. The rod 127 of the actuator 100 moves in the opposite direction (the opposite of 70) to return the sliding assembly 43 to a position close to the first platform 20. That allows the families 8 of blades 9 to be returned to the operational position.

The free end 36 then lies flush with the first platform 20 (periphery). As a result, the profiled sections 22 are locked by means of the locking means 71a. The base 60 is unblocked by blocking means 134 so as to allow it to slide along the rails 63.

According to another alternative form of this embodiment illustrated in FIGS. 18 and 19, the movement means 23 also comprise at least one actuator 32 arranged in the rotor 5 in a direction parallel to the front 6 and/or rear 7 faces. In the example of an actuator (see FIG. 18), the distal end 40 of the rod 27 is fixed to the end 59' of the root 58 of the support 24 and the proximal end 41 of the cylinder 25 is fixed to the sliding assembly 43. In another alternative form of this embodiment, the distal end of the rod 27 of the piston 26 may be secured to the mounting plate 57 (the support 24 then not having a root 58). The movement means 23 may also be situated on the outside of the rotor 5, toward the rear face 7 of the rotor 5, thereby freeing up the internal central part of the rotor 5.

FIGS. 25, 26 and 27 illustrate another embodiment of the wind turbine 1 in an example of a situation in which the winds are violent (very strong wind, cyclone, storm) and require the static or dynamic wind turbine 1 to be made safe. In order to bring the wind turbine 1 into the safety position, it is necessary to place the rotor 5 with its "back" into the wind. That is generally done by pivoting the chassis 39 with respect to the axis of the mast 2 of the wind turbine 1. The families 8 of blades 9 then have their backs to the direction 16 of the wind. In the case of a dynamic wind turbine 1, the latter is preferably in an initial position which here corresponds to the initial position (light wind), which means to say that the families 8 of blades 9 are near the front face 6 (see FIGS. 6b and 25). The safety position may also begin with an initial position corresponding to the developed (strong wind) position (see FIGS. 8b and 26).

For a static wind turbine that is to be brought into a safety position (FIG. 27 for example), all that is required is for the chassis 39 to be rotated until the blades have their back into the wind.

FIGS. 28 to 35 illustrate another preferred way of feathering the wind turbine 1 from the safety position in which the families of blades are in the up position (developed position illustrated for example in FIG. 26) or preferably in which the families of blades 9 are in the down position (initial position (see for example FIG. 25). In this feathered position, the support 24 has rotation means allowing it to rotate about an axis 133 passing through the root 58 of the support 24. This feathering said to be feathering by rotation is intended to considerably reduce the windage by offering a span that is less than or at least identical to that of the pivoted feathered configuration as seen earlier, for violent winds. This configuration allows the families 8 of blades 9 to be brought closer together by bringing the ends 10 of the blades 9 as close as possible to the axis of rotation 15 of the rotor 5. The root 58 of the support 24 of the family 8 of blades 9 has a shaft 130 pivoting about the axis of rotation 133 via rolling bearings 125. This shaft 130 has a lower end connected to a female component 129 intended to collaborate with part of a splined shaft 128 of the power take-off type. This shaft 128 is connected to an electric motor 121 sliding between the crossmembers 115a, 115b by means of guide rails 122 installed between the crossmembers 115a, 115b. The motor slides in the guide rails 122 under the action of an actuator 126 via a rod 127, at least one connecting rod 124 and pivot connections 123 and 123'. The motor 121 is able to move between a first position of actuating the rotation of the support 24, in which position the shaft 128 is connected to the female component 129, and a neutral second position in which the shaft 128 is disconnected from the female component 129. One motor 121 is provided for each family of blades. The actuator 126 is mounted on the shaft 44 and the rod 127 of the actuator 126 moves along the axis of rotation 15.

In a first alternative form of this embodiment, the base 60 is mounted on a pivoting plate equipped in its lower part with the female component 129 intended to be connected directly to the shaft 128 (no shaft 130 in this alternative form). In order to allow the pivoting plate and the base 60 to rotate, the rail 63 comprises a groove (not depicted) allowing the lower part of the base 60 to pass.

In a preferred second alternative form of this embodiment, the upper part of the shaft 130 is connected to the base 60. In this alternative form, the profiled sections 22 are fixed with respect to the crossmembers 115a, 115b and first and second platforms (FIGS. 34 and 35). Locking means 71d (FIG. 35) block or release the rotation of the shaft 130. The base 60 is locked beforehand by the blocking means situated in the lower part 134 of the base 60 preventing the base 60 from sliding along the rails 63. When the rod 127 of the actuator 126 is retracted (FIG. 35), the motor 121 is then in the neutral position and there is no possibility of drive. When the rod 127 of the actuator 126 is deployed (FIG. 34), the motor 121 is then in the actuating position, the shaft 128 therefore driving the shaft 130 which allows the support 24 on which the blades 9 are situated to rotate. In order to allow the support 24 to rotate after the shaft 128 and the female component 129 have been connected, the shaft 130 is unlocked from the base 60 using the locking means 71d. The motor 121, the locking means 71d, the actuator 126 and the blocking means may be actuated remotely. The support 24 may pivot through an angle of rotation of between 0° and 360°. For preference, the support 24 pivots between 0° and 180°. After the hurricane has passed and checks have been carried out the motor 121 is actuated to return the families 8 of blades 9 to their operational initial position (either by reverse rotation or by rotation in the same direction achieving a 360°. FIGS. 30 and 31 illustrate an intermediate pivoting by an angle of 90°. A position sensor 131, positioned for example between the shaft 130 and the base 60, allows the rotation of the motor 121 to be stopped when the feathered position is finalized, namely when the root 58 has pivoted through 180° (FIGS. 32 and 33) in the clockwise direction (arrow 135). When the support 24 has reached an angle of 180°, the front face 213 that each blade 9a, 9b, 9c of the families 8 of blades has is facing into the wind unlike in the safety position in which the front face 213 of the blades has its back to the wind. The span e1, e2, e3 of the force blade 9c decreases therefore from e1 to e3, where e1>e2>e3, according to the angle occupied by the support.

FIGS. 10a and 10b illustrate yet another embodiment of the wind turbine 1 comprising dynamic blade families 8. In FIG. 10a the families 8 of blades are in the initial position close to the axis of rotation 15 of the rotor 5. In order to cope with a strong wind, the families 8 of blades move at the same time toward the developed position in which the families 8 of blades are situated some distance from the horizontal axis 15 of the rotor by means of the movement means 23. The families 8 of blades are also each mounted on a support 24. These latter 24 are positioned on the external surface 12 of the rotor 5. Each support 24 is fixed, in this instance, to the distal end of the piston rod 27 moving translationally in the cylinder 25 in the radial direction of the rotor 5. The wall 33 also has through-openings 28' allowing for the passage of the rod 27 of the piston 26 moving between the initial position and the developed position. As the piston-actuator assembly that acts on the support 24 moves, this moves the families 8 of blades in a radial movement, the rod 27 pushing the support 24 with respect to the axis of rotation 15 of the rotor 5. Thus, in FIG. 10b, the support 24 and the blades 9a, 9b, 9c are some distance from the surface of the rotor 5 although the blades maintain the configuration of the initial position. It will be appreciated that, in this embodiment, after the blades 9a, 9b, 9c have moved, they still face into the wind. By moving the families 8 of blades the surface area of the exhaust zone 34 is also varied. In FIG. 10b, the surface area of the exhaust zone 34' is greater than the surface area of the initial exhaust zone 34 when the blades 9 are near the surface of the rotor 5.

FIGS. 11 and 12 depict yet another embodiment of the wind turbine comprising dynamic blade families 8. According to this embodiment, the wall 33 of the rotor 5 comprises through-openings 28" (see FIG. 14) allowing the movement of the blades 9. The through-openings 28" extend in a curve 46. In particular, the curve 46 that the through-openings 28" form has a first portion 47 extending substantially longitudinally from the front face 6 toward the rear face 7 and a second portion 48 extending in a direction substantially parallel to the direction 17 of the blade root end 11 of the force blade 9c. Guide means 45 installed in the rotor 5 move each blade of a family 8 substantially in a rotation, in this instance in the direction of the arrow 38, about the axis of rotation of the rotor 5 between an initial position in which the blades 9 are close to the axis of rotation and a retracted position in which the blades are still close to the axis of rotation and placed behind one another. Likewise, in this embodiment, it will be appreciated that, after the blades 9a, 9b, 9c have moved, they still face into the wind. The guide means 45 comprise for example at least one connecting rod (not depicted) having an end mounted in rotation on the shaft 44 and another end fixed to the blade root end 11 of one of the blades of the family 8. One connecting rod is provided for each blade. It is possible to provide a disk in place of a connecting rod. The guide means 45 also comprise locking elements (not depicted) blocking the blades either in the initial position or in the retracted position. The microcontroller commands the blocking or unblocking of the locking means using information received from the cell 50 or from the anemometer 61 or a remote command from an operator. The blades 9 that are arranged behind one another allow the exhaust zone 34 to be enlarged so that a larger quantity of air can be removed.

The present wind turbine 1 is perfectly suited to use onshore (particular use: inhabited regions, commercial regions or regions of activity) or to use offshore.

The invention is described in the foregoing by way of example. It must be understood that a person skilled in the art is able to vary the embodiments of the invention in various ways for example by combining the various features above considered alone or in combination, without thereby departing from the scope of the invention.

The invention claimed is:

1. A wind turbine comprising:
    a rotor for rotating about a horizontal axis of rotation substantially parallel to a direction of wind that is present, the rotor comprising:
        a front face facing into the wind and substantially perpendicular to the direction of the wind: and
        a rear face situated toward a support of the rotor; and
    a first family of blades distributed over the rotor, wherein the first family of blades comprises:
        a first force blade comprising:
            a first surface arranged substantially perpendicular to the direction of the wind;
            a first free end; and
            a first blade root end connected to the first surface and the rotor;
        a first catching blade guiding the wind toward the first force blade, the first catching blade comprising:
            a second surface arranged substantially perpendicular to the direction of the wind;
            a second free end; and
            a second blade root end connected to the second surface and the rotor, wherein the first force blade is static in being fixed in orientation relative to the rotor and the first catching blade is static in being fixed in orientation relative to the rotor and the first force blade;
        wherein the first blade root end and the second blade root end are successively offset on an exterior surface of the rotor along the horizontal axis of rotation of the rotor, and the first blade root end and the second blade root end are arranged on the exterior surface of the rotor at a first predetermined angle ($\alpha$1) and a second predetermined angle ($\alpha$2), respectively, formed between the horizontal axis of rotation of the rotor and a direction of the first blade root end and the second blade root end, respectively, the first force blade and the first catching blade stand out from the rotor in a longitudinal direction that forms a third predetermined angle ($\beta$1) and a fourth predetermined angle ($\beta$2) with the exterior surface of the rotor, and each of the first, second, third, and fourth predetermined angles is greater than 0° and less than or equal to 90°;
        wherein when viewed along the horizontal axis of rotation of the rotor, the first catching blade has a first radial length as measured from the horizontal axis of rotation of the rotor and the first force blade has a second radial length as measured from the horizontal axis of rotation of the rotor, wherein the first radial length is different than the second radial length in magnitude,
        wherein the first blade root end of the first force blade is less wide than the first free end of the first force blade and the second blade root end of the first catching blade is less wide than the second free end of the first catching blade,
        wherein the second blade root end of the first catching blade is wider than the first blade root end of the first force blade, and
    a second family of blades distributed over the rotor, wherein the second family of blades is immediately adjacent to and distinct from the first family of blades, the second family of blades comprising:
        a second force blade connected to the rotor; and
        a second catching blade guiding the wind toward the second force blade, wherein an exhaust zone is defined between the first force blade and the second catching blade such that no blade exists within the exhaust zone and the exhaust zone subtends an azimuthal angle relative to the horizontal axis of rotation that has a magnitude that is greater than 30°.

2. The wind turbine according to claim 1, wherein the first catching blade is positioned in front of the first force blade along the horizontal axis of rotation of the rotor.

3. The wind turbine according to claim 1, wherein the first family of blades comprises a first guide blade which guides the wind toward the first force blade.

4. The wind turbine according to claim 3, wherein the first radial length of the first catching blade is reduced in comparison with a third radial length of the first guide blade as measured from the horizontal axis of rotation, wherein the third radial length is reduced in comparison with the second radial length of the first force blade as measured from the horizontal axis of rotation.

5. The wind turbine according to claim 3, wherein the second family of blades comprises a second guide blade which guides the wind toward the second force blade.

6. The wind turbine according to claim 5, wherein the second catching blade has a third radial length as measured from the horizontal axis of rotation that is reduced in comparison with a fourth radial length of the second guide blade as measured from the horizontal axis of rotation, wherein the fourth radial length is reduced in comparison with a fifth radial length of the second force blade as measured from the horizontal axis of rotation.

7. The wind turbine according to claim 1, wherein the rotor comprises a cylindrical section.

8. The wind turbine according to claim 1, wherein the second force blade comprises:
    a third surface arranged substantially perpendicular to the direction of the wind;
    a third free end; and
    a third blade root end connected to the third surface and the rotor; and wherein the second catching blade comprises:
    a fourth surface arranged substantially perpendicular to the direction of the wind;
    a fourth free end; and
    a fourth blade root end connected to the fourth surface and the rotor;
        wherein the third blade root end and the fourth blade root end are successively offset on the exterior surface of the rotor along the horizontal axis of rotation of the rotor, and the third blade root end and the fourth blade root end are each arranged on the exterior surface of the rotor at the first predetermined angle (α) formed between the horizontal axis of rotation of the rotor and a direction of the corresponding blade root end, the second force blade and the second catching blade each stand out from the rotor in a longitudinal direction that forms the second predetermined angle (β) with the exterior surface of the rotor.

9. The wind turbine according to claim 8, wherein the second catching blade is positioned in front of the second force blade along the horizontal axis of rotation of the rotor.

10. The wind turbine of claim 1, wherein the azimuthal angle has a magnitude that is greater than 90°.

\* \* \* \* \*